United States Patent [19]

Uematsu et al.

[11] Patent Number: 5,751,720
[45] Date of Patent: May 12, 1998

[54] POINTER PROCESSOR AND POINTER PROCESSING SCHEME FOR SDH/SONET TRANSMISSION SYSTEM

[75] Inventors: Yoshihiko Uematsu, Tokyo; Shinji Matsuoka, Kanagawaken, both of Japan

[73] Assignee: Nippon Telegraph and Telephone Corporation, Tokyo, Japan

[21] Appl. No.: 671,244

[22] Filed: Jun. 27, 1996

[30] Foreign Application Priority Data

Jun. 28, 1995 [JP] Japan .................. 7-162499

[51] Int. Cl.$^6$ .................................................. H04J 3/06
[52] U.S. Cl. .................................................. 370/503
[58] Field of Search ........................... 370/503, 505, 370/506, 516, 509, 510; 375/354, 355, 371, 372

[56] References Cited

U.S. PATENT DOCUMENTS

| | | | |
|---|---|---|---|
| 5,331,630 | 7/1994 | Fujita et al. | 370/503 |
| 5,390,180 | 2/1995 | Reilly | 370/503 |
| 5,461,622 | 10/1995 | Bleickardt et al. | 370/503 |
| 5,473,611 | 12/1995 | Gilboa et al. | 370/503 |
| 5,528,598 | 6/1996 | Ng | 375/371 |
| 5,535,218 | 7/1996 | Ng et al. | 370/503 |
| 5,572,515 | 11/1996 | Williamson et al. | 370/252 |

FOREIGN PATENT DOCUMENTS 5-167551  2/1993  Japan .
6-268621  9/1994  Japan .

OTHER PUBLICATIONS

Excerpt from ITU–T Recommendation GO–70X published May 1994, pp. 30–39.

Primary Examiner—Douglas W. Olms
Assistant Examiner—Ajit Patel
Attorney, Agent, or Firm—Banner & Witcoff, Ltd.

[57] ABSTRACT

A pointer processor for use in an SDH/SONET transmission system, realizing a proper VC path management. A pointer interpreter constantly monitors 3X pairs of H1 and H2 bytes to contain a prescribed maximum size pointer AU-4-Xc that can possibly be received by the pointer processor, to obtain and hold an inside AU-size map indicating an occupation state of AU pointers on 3X pairs of H1 and H2 bytes, while generating and holding an assigned AU-size map indicating an assigned state of AU pointers on 3X pairs of H1 and H2 bytes according to an externally set AU pointer size, and compares these two AU-size maps. For a part of map where the inside AU-size map coincides with the assigned AU-size map, the pointer interpreter carries out size-fixed pointer interpretations in pointer sizes specified by the assigned AU-size map, and the pointer generator generates transmission pointers in forms of normal pointers or AISs in the pointer sizes specified by the assigned AU-size map according to the size-fixed pointer interpretations. For a part of map where the inside AU-size map does not coincide with the assigned AU-size map, the pointer generator generates AISs in the pointer sizes specified by the assigned AU-size map as the transmission pointers.

10 Claims, 11 Drawing Sheets

| STM-1 #i | H1, H2 | AU-3 (VC-3) | AU-4 (VC-4) | AU-4-4c (VC-4-4c) | AU-4-16c (VC-4-16c) |
|---|---|---|---|---|---|
| #1 | #1 | ptr #1 (VC-3 #1) | ptr #1 (VC-4 #1) | ptr #1 (VC-4-4c #1) | ptr #1 (VC-4-16c #1) |
| | #2 | ptr #2 (VC-3 #2) | | | |
| | #3 | ptr #3 (VC-3 #3) | | | |
| #2 | #4 | ptr #4 (VC-3 #4) | ptr #2 (VC-4 #2) | | |
| | #5 | ptr #5 (VC-3 #5) | | | |
| | #6 | ptr #6 (VC-3 #6) | | | |
| #3 | #7 | ptr #7 (VC-3 #7) | ptr #3 (VC-4 #3) | | |
| | #8 | ptr #8 (VC-3 #8) | | | |
| | #9 | ptr #9 (VC-3 #9) | | | |
| #4 | #10 | ptr #10 (VC-3 #10) | ptr #4 (VC-4 #4) | ptr #4 (VC-4-4c #4) | |
| | #11 | ptr #11 (VC-3 #11) | | | |
| | #12 | ptr #12 (VC-3 #12) | | | |
| ... | ... | ... | ... | ... | |
| | ... | ... | ... | | |
| #16 | #46 | ptr #46 (VC-3 #46) | ptr #16 (VC-4 #16) | | |
| | #47 | ptr #47 (VC-3 #47) | | | |
| | #48 | ptr #48 (VC-3 #48) | | | |

FIG.10

SOH 4TH ROW OF STM-64 FRAME

| | H1 #46 | H1 #47 | H1 #48 | H2 #46 | H2 #47 | H2 #48 | H3 | H3 | H3 |
|---|---|---|---|---|---|---|---|---|---|
| STM-1 #64 | H1 #46 | H1 #47 | H1 #48 | H2 #46 | H2 #47 | H2 #48 | H3 | H3 | H3 |
| ⋮ | | | | | | | | | |
| STM-1 #50 | H1 #4 | H1 #5 | H1 #6 | H2 #4 | H2 #5 | H2 #6 | H3 | H3 | H3 |
| STM-1 #49 | H1 #1 | H1 #2 | H1 #3 | H2 #1 | H2 #2 | H2 #3 | H3 | H3 | H3 |
| ⋮ | | | | | | | | | |
| STM-1 #16 | H1 #46 | H1 #47 | H1 #48 | H2 #46 | H2 #47 | H2 #48 | H3 | H3 | H3 |
| ⋮ | | | | | | | | | |
| STM-1 #2 | H1 #4 | H1 #5 | H1 #6 | H2 #4 | H2 #5 | H2 #6 | H3 | H3 | H3 |
| STM-1 #1 | H1 #1 | H1 #2 | H1 #3 | H2 #1 | H2 #2 | H2 #3 | H3 | H3 | H3 |

FIG.16

POINTER PROCESSOR AND POINTER PROCESSING SCHEME FOR SDH/SONET TRANSMISSION SYSTEM

BACKGROUND OF THE INVENTION

1. Field of the Invention

The present invention relates to a pointer processor and a pointer processing scheme which extract VCs (Virtual Containers) synchronized with a recovered line clock and synchronize the extracted VCs to an equipment clock, which are utilizable in a synchronized digital multiplexing transmission system such as SDH (Synchronous Digital Hierarchy) transmission system and SONET (Synchronous Optical NETwork) transmission system.

2. Description of the Background Art

In an SDH transmission equipment constituting an SDH network, a location of a byte where a VC path begins is indicated by an AU (Administrative Unit) pointer, and when an equipment synchronizes a received VC synchronized with a recovered line clock to an equipment clock, a pointer processor carries out a received pointer interpretation and a new pointer generation. The AU pointer is contained in H1 and H2 bytes within an STM-N (Synchronous Transport Module-N) transmission frame (N is a natural number).

Figure 1:
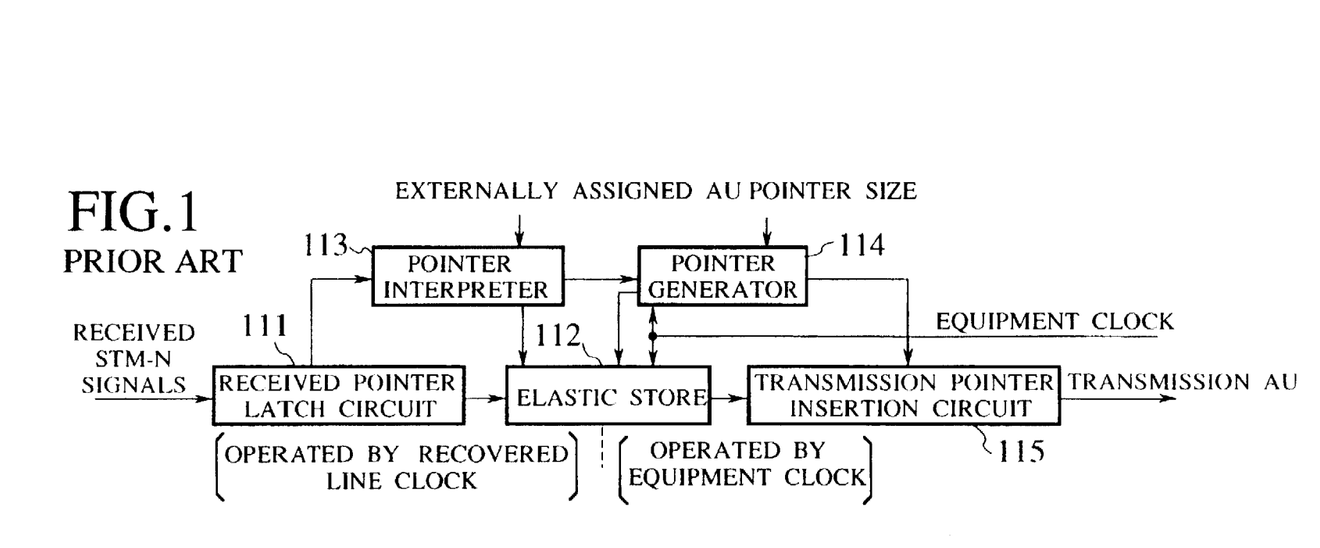
FIG. 1 is a schematic block diagram of a conventional pointer processor for an SDH/SONET transmission equipment.

FIG. 1 shows an exemplary configuration of a conventional pointer processor for STM-N signals. In this conventional pointer processor of FIG. 1, a received pointer latch circuit 111 has a function for detecting AU pointers from 3N pairs of H1 and H2 bytes contained in the received STM-N signals. An elastic store 112 extracts all VCs contained in the received STM-N signals synchronized with a recovered line clock and synchronizes the extracted VCs to an equipment clock. A pointer interpreter 113 judges received pointer indications and values from received AU pointers notified from the received pointer latch circuit 111, and generates inside pointers according to the received pointer indications and values. A pointer generator 114 generates transmission pointers from the inside pointers and a phase difference between the recovered line clock and the equipment clock. A transmission pointer insertion circuit 115 inserts the transmission pointers into the AUs synchronized with the equipment clock at the elastic store 112 and outputs resulting transmission AUs.

When the equipment is under operation of the network management system, the pointer processor executes pointer processings for AUs according to AU pointer sizes assigned from the network management system. This operation mode of the pointer processor is called assigned mode. In the assigned mode, the pointer interpreter 113 monitors the received pointers in AU pointer sizes assigned from the management system, and judges the received pointers as normal or abnormal. Also, a size of the transmission pointer is always identical to the assigned pointer size.

Figure 2A:
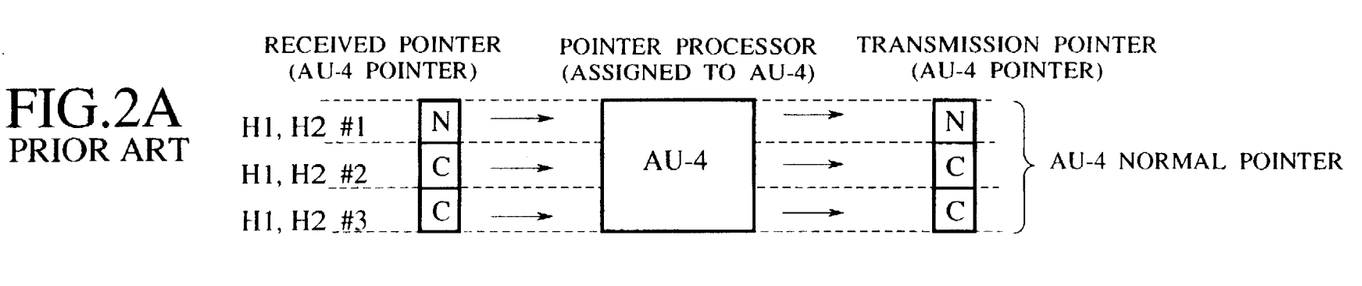
FIGS. 2A and 2B are diagrams illustrating two exemplary assigned mode operations of the conventional pointer processor of FIG. 1.
Figure 2B:
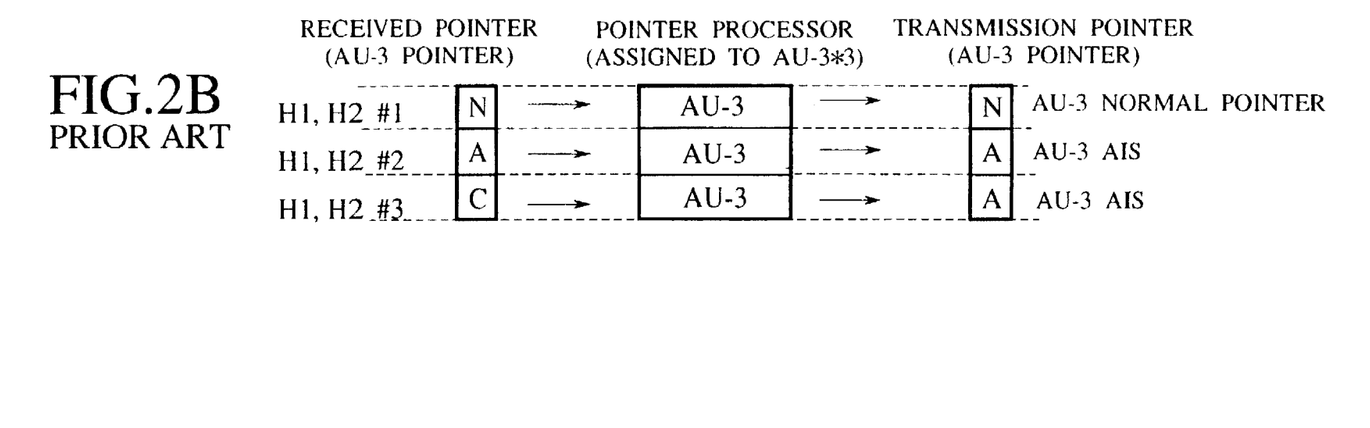

An exemplary operation of the assigned mode in the conventional pointer processor is shown in FIG. 2A and FIG. 2B, where FIG. 2A shows an exemplary operation of the pointer processor assigned to AU-4 while FIG. 2B shows an exemplary operation of the pointer processor assigned to AU-3*3. In the STM-N signals, N sets of STM-1 signals STN-1#1 to STM-1#N are byte-interleaved, and FIG. 2A and FIG. 2B only show a portion which carries out a processing for a certain STM-1#i within the pointer processor. In FIG. 2A and FIG. 2B, a received pointer indication, an assigned pointer size, and a transmission pointer indication are indicated for three pairs of H1 and H2 bytes contained in STM-1#i. Here, a pointer indication N, C, or A is a pointer indication specified by each H1 and H2 bytes pair, where N indicates a normal pointer, C indicates a concatenation indicator, and A indicates an AIS (Alarm Indication Signal).

Figure 3:
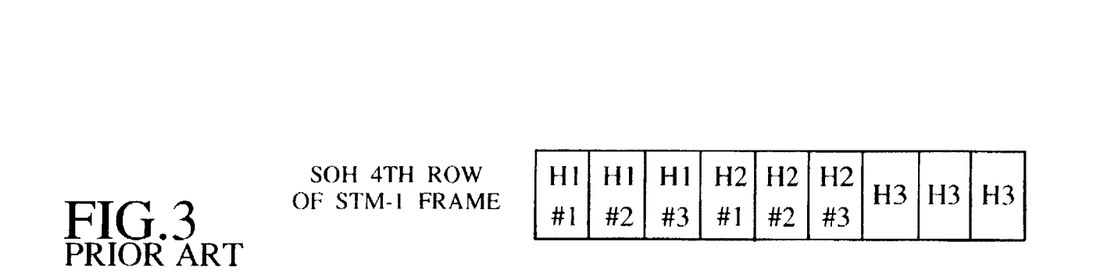
FIG. 3 is a diagram illustrating a known H1 and H2 bytes numbering scheme for an actual STM-1 frame.
Figure 4:
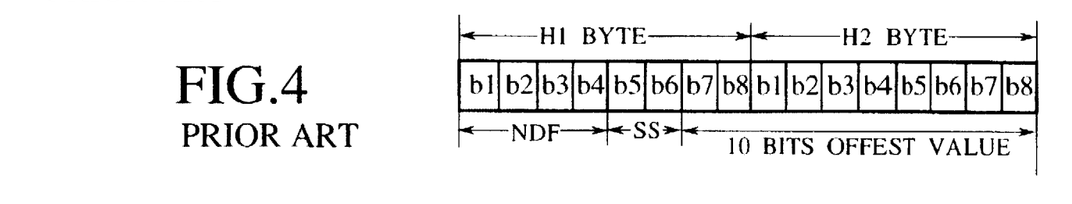
FIG. 4 is a diagram illustrating a known H1 and H2 bytes interpretation scheme.

The actual STM-1#i frame uses the H1 and H2 bytes numbering as indicated in FIG. 3 and the H1 and H2 bytes pair interpretation as indicated in FIG. 4. NDF is a flag indicating "Enable" in a case of pointer value change or "DISABLE" in a case of no pointer value change. SS is a VC type indicated by the pointer, which is set to "10" in a case of VC-3, VC-4, VC-4-4c, and VC-4-16c. 10 bits offset value indicates a VC start position indication and a stuffing command.

Figure 5:
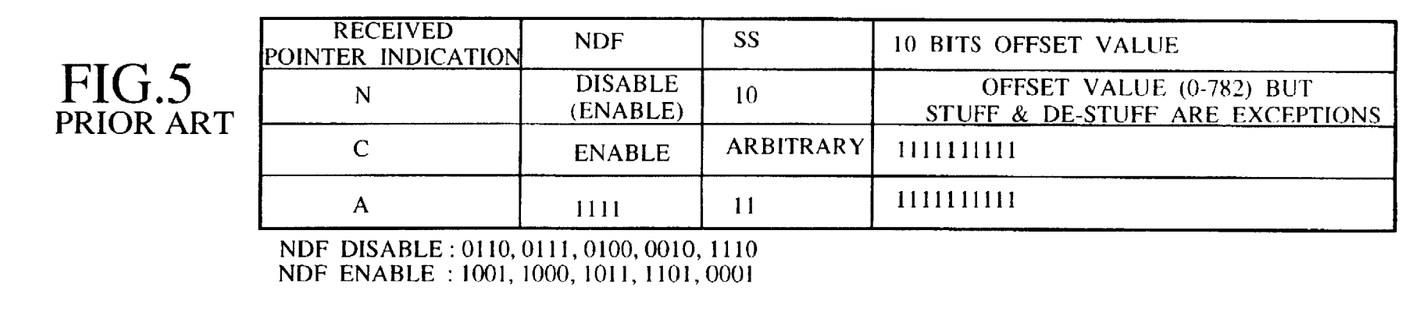
FIG. 5 is a table showing known definitions of received pointer indications.
Figure 6:
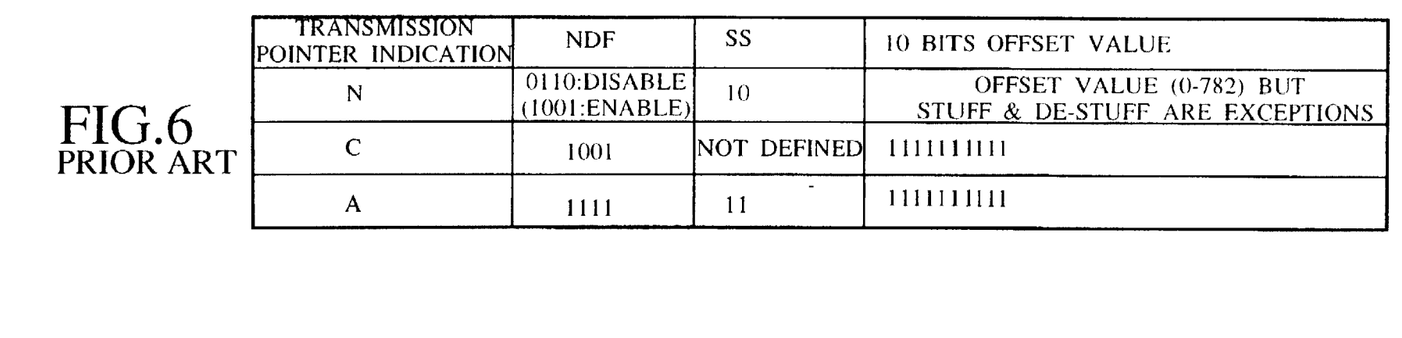
FIG. 6 is a table showing known definitions of transmission pointer indications.

The definitions of the received pointer indications and transmission pointer indications in accordance with the ITU recommendation are shown in FIG. 5 and FIG. 6, respectively. As for the interpretation of the received NDF, the pointer interpreter tolerates up to 1 bit error as indicated in FIG. 5, considering an occurrence of bit errors on the transmission line.

Next, the definition of the pointer in each AU size will be explained.

An STM-1#i frame can contain three VC-3 paths, and their start positions are indicated by the three AU-3 pointers. The AU-3 pointer is contained in one H1 and H2 bytes pair. The AU-3 normal pointer is defined to have "N" in this H1 and H2 bytes pair. The AU-3 AIS is defined to have "A" in this H1 and H2 bytes pair.

One VC-4 path can be contained in an STM-1#i, and the AU-4 pointer is contained in three H1 and H2 bytes pairs. The AU-4 normal pointer is defined to have "N" in the H1 and H2 bytes pair #1 and "C" in the H1 and H2 bytes pairs #2 and #3. When all of the H1 and H2 bytes pairs #1, #2 and #3 are "A", it is regarded as the AU-4 AIS.

One VC-4-4c path can be contained in division over STM-1#i to STM-1#i+3, and the AU-4-4c pointer is contained in twelve H1 and H2 bytes pairs within STM-1#i to STM-1#i+3. The AU-4-4c pointer is interpreted as the AU-4-4c normal pointer when the first H1 and H2 bytes pair #1 is "N" while the other eleven pairs are "C".

In FIG. 2A, when a pointer processor assigned to AU-4 receives "N", "C" and "C" pointers, it is judged as normal and the AU-4 normal pointer is transmitted.

In FIG. 2B, when a pointer processor assigned to AU-3 receives an "N" pointer, it is judged as normal and the AU-3 normal pointer is transmitted, and when a pointer processor assigned to AU-3 receives an "A" pointer, it is judged as AIS reception and the AU-3 AIS is transmitted. When the other pointers are received over a prescribed number of frames for confirmation, it is judged as LOP (Loss Of Pointer) and the AU-3 AIS is transmitted.

Figures 7, 8:
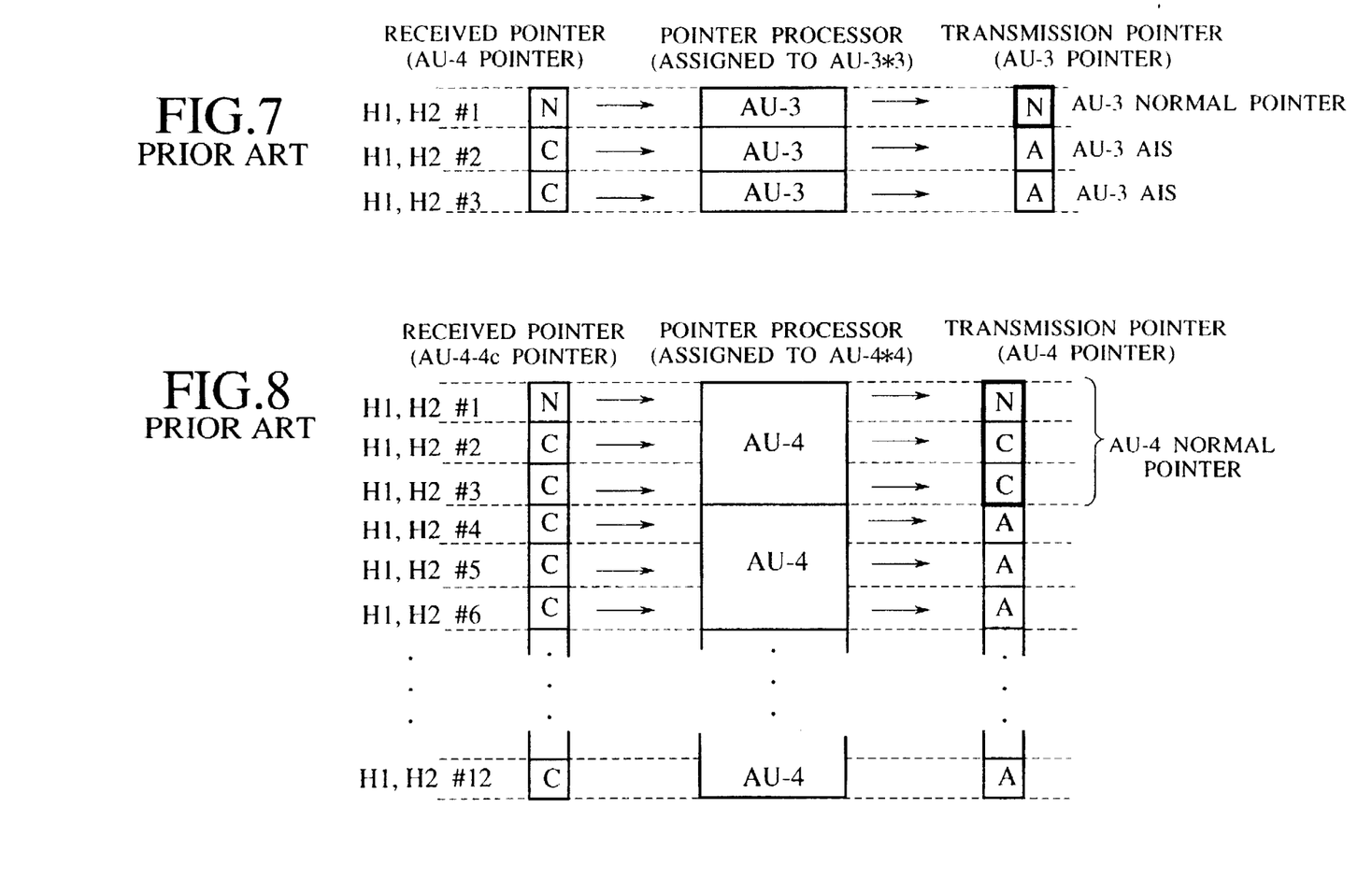
FIG. 7 is a diagram illustrating an exemplary problematic situation that can be encountered in the assigned mode operation by the conventional pointer processor of FIG. 1.
FIG. 8 is a diagram illustrating an exemplary problematic situation that can be encountered in the assigned mode operation by a future large capacity transmission equipment.

In the conventional pointer processor, the received pointer is monitored only within assigned sizes, so that there can be a problematic situation as shown in FIG. 7. Namely, FIG. 7 shows a case in which the pointer processor assigned to AU-3 receives the AU-4 pointer (N, C, C). In this case, the H1 and H2 bytes pair #1 processing part of the pointer processor assigned to AU-3 judges that the AU-3 normal pointer is received when "N" part of the AU-4 pointer is received. As a result, the AU-3 normal pointer is inserted as the transmission pointer. The H1 and H2 processing parts #2 and #3 receive "C" parts of AU-4 normal pointer and judge that they are receiving AU-3 invalid pointers, and output AU-3 AIS pointers as the transmission pointers. Consequently, a part of VC-4 is transmitted to another equipment as a VC-3 normal path erroneously.

Also, a future large capacity transmission equipment needs to simultaneously convey large capacity paths such as VC-4-4c and VC-4-16c in addition to small capacity paths such as VC-3 and VC-4. In such a case, there can be a similar problematic situation as in a case of FIG. 7 described above. FIG. 8 shows an exemplary case in which the pointer processor assigned to AU-4 receives the VC-4-4c pointer. In this case, according to the conventional scheme for monitoring the received pointer only within assigned pointer sizes, a part of the VC-4-4c path corresponding to the H1 and H2 bytes pairs #1, #2 and #3 will be erroneously passed as a VC-4 normal path.

This type of a problematic situation can occur in every case in which the received pointer size is larger than the assigned pointer size, and it can be easily caused by an erroneous connection of transmission lines or erroneous AU assignment by the network management system, so that the VC path management according to the AU size assignment will be difficult in an SDH based transmission network conveying a variety of paths.

SUMMARY OF THE INVENTION

It is therefore an object of the present invention to provide a pointer processor and a pointer processing scheme for an SDH transmission system which can realize a proper VC path management even when an SDH transmission equipment conveys all kinds of paths ranging from VC-3 to VC-4-Xc.

According to one aspect of the present invention there is provided a pointer processor for an SDH/SONET transmission system, comprising: a pointer latch circuit for detecting AU pointers from 3N pairs of H1 and H2 bytes contained in received STM-N signals; an elastic store for extracting all VCs contained in the received STM-N signals synchronized with a recovered line clock and synchronizing the extracted VCs to an equipment clock; a pointer interpreter for judging received pointer indications and values from AU pointers notified from the received pointer latch circuit and generating inside pointers according to the received pointer indications and values; a pointer generator for generating transmission pointers from the inside pointers and a phase difference between the recovered line clock and the equipment clock; and a transmission pointer insertion circuit for inserting the transmission pointers into AUs outputted from the elastic store and transmitting resulting transmission AUs; wherein the pointer interpreter constantly monitors 3X pairs of H1 and H2 bytes to contain a prescribed maximum size pointer AU-4-Xc that can possibly be received by the pointer processor, where X is a natural number, to obtain and hold an inside AU-size map indicating an occupation state of AU pointers on said 3X pairs of H1 and H2 bytes; the pointer interpreter generates and holds an assigned AU-size map indicating an assigned state of AU pointers on said 3X pairs of H1 and H2 bytes according to an externally set AU pointer size; the pointer interpreter compares the inside AU-size map and the assigned AU-size map; the pointer interpreter carries out size-fixed pointer interpretations in pointer sizes specified by the assigned AU-size map, for a part of map where the inside AU-size map coincides with the assigned AU-size map; the pointer generator generates transmission pointers in forms of normal pointers or AISs in the pointer sizes specified by the assigned AU-size map according to the size-fixed pointer interpretations, for a part of map where the inside AU-size map coincides with the assigned AU-size map; and the pointer generator generates AISs in the pointer sizes specified by the assigned AU-size map as the transmission pointers, for a part of map where the inside AU-size map does not coincide with the assigned AU-size map.

According to another aspect of the present invention there is provided a method of pointer processing in a pointer processor for an SDH/SONET transmission system, comprising the steps of: detecting AU pointers from 3N pairs of H1 and H2 bytes contained in received STM-N signals; extracting all VCs contained in the received STM-N signals synchronized with a recovered line clock and synchronizing the extracted VCs to an equipment clock at an elastic store; generating and holding an assigned AU-size map indicating an assigned state of AU pointers on 3X pairs of H1 and H2 bytes to contain a prescribed maximum size pointer AU-4-Xc that can possibly be received by the pointer processor, where X is a natural number, according to an externally set AU pointer sizes; judging received pointer indications and values from AU pointers and generating inside pointers according to the received pointer indications and values; constantly monitoring said 3X pairs of H1 and H2 bytes to obtain and hold an inside AU-size map indicating an occupation state of AU pointers on said 3X pairs of H1 and H2 bytes; comparing the inside AU-size map and the assigned AU-size map; carrying out size-fixed pointer interpretations in pointer sizes specified by the assigned AU-size map, for a part of map where the inside AU-size map coincides with the assigned AU-size map; generating transmission pointers in forms of normal pointers or AISs in the pointer sizes specified by the assigned AU-size map according to the size-fixed pointer interpretations, for a part of map where the inside AU-size map coincides with the assigned AU-size map; generating AISs in the pointer sizes specified by the assigned AU-size map as the transmission pointers, for a part of map where the inside AU-size map does not coincide with the assigned AU-size map; and inserting the transmission pointers into AUs outputted from the elastic store and transmitting resulting transmission AUs.

Other features and advantages of the present invention will become apparent from the following description taken in conjunction with the accompanying drawings.

DETAILED DESCRIPTION OF THE PREFERRED EMBODIMENTS

First, the prerequisite conditions assumed in the following description of the present invention will be described.

Figure 9:
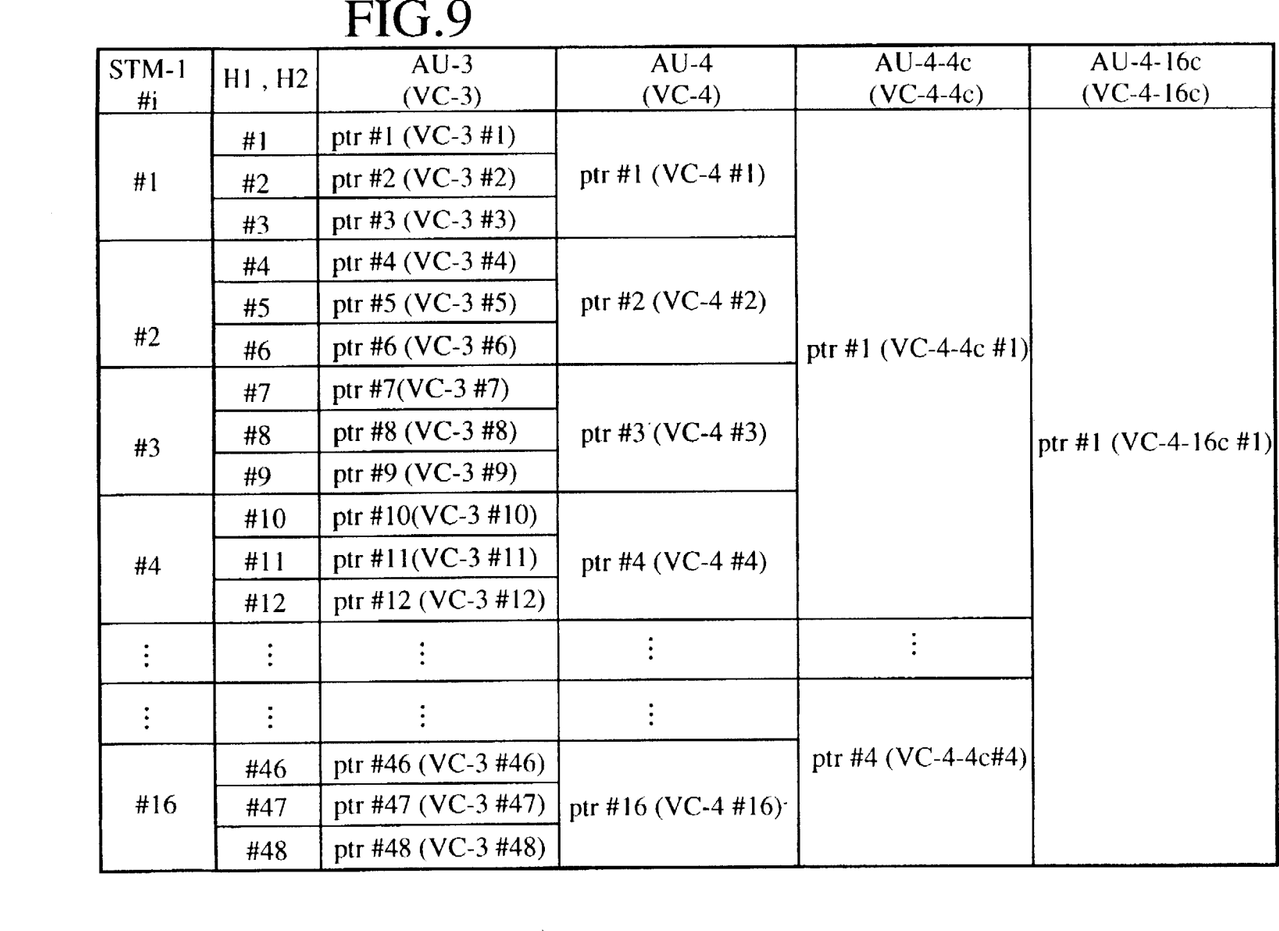
FIG. 9 is a table showing AU pointer containing positions in H1 and H2 bytes of STM-N frame and corresponding VC paths which are used in the present invention.

For given maximum size pointer AU-4-Xc and maximum size path VC-4-Xc, AU pointers and VC paths in sizes not greater than the maximum size are assumed to be contained at positions as indicated in FIG. 9, which shows an exemplary case of X=16.

Figure 10:
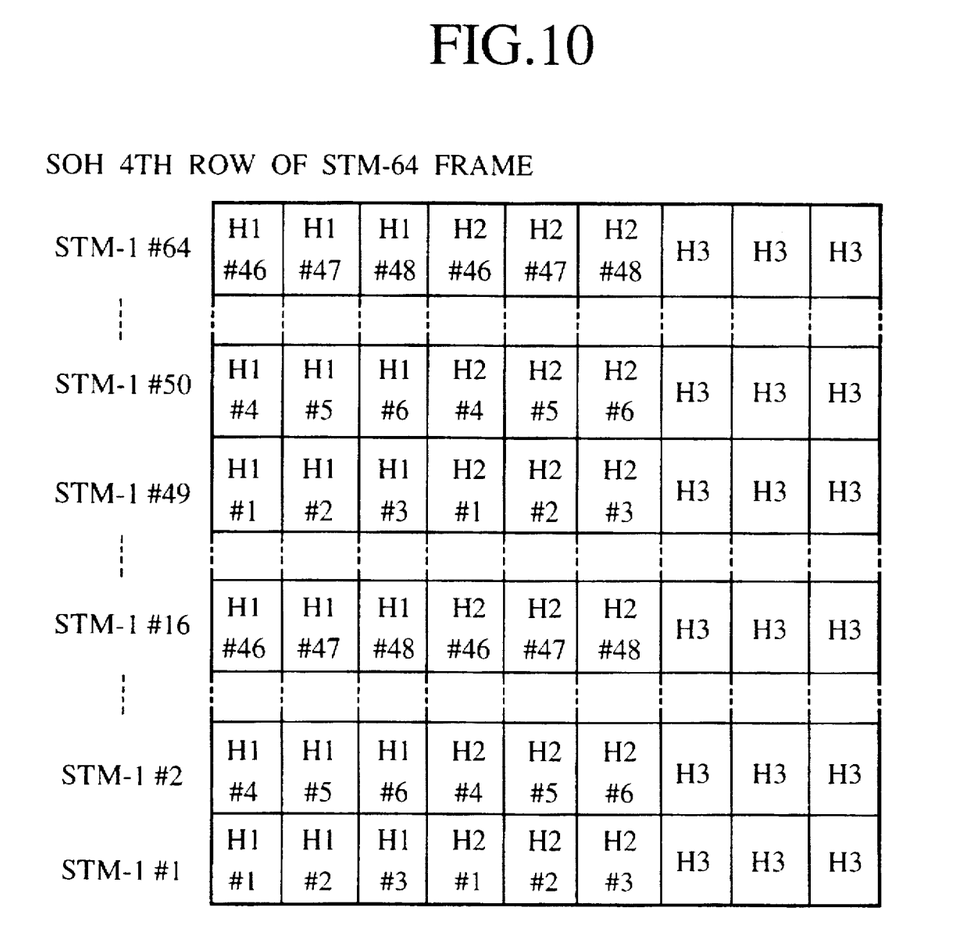
FIG. 10 is a diagram illustrating an H1 and H2 bytes numbering scheme for an actual STM-64 frame which is used in the present invention.

Also, the numbering scheme for the H1 and H2 bytes on the STM frame to be actually transmitted is indicated in FIG. 10, which shows an exemplary case of mapping four AU-4-16c pointers to the STM-64 frame. In this manner, it is assumed that the contained positions of the maximum size pointer AU-4-Xc and the path VC-4-Xc pointed by that pointer are determined in advance with respect to the STM-N frame.

In the STM-64 frame, sixty-four STM-1 signals STM-1#1 to STM-1#64 are sixty-four times byte-interleaved, and in the STM-64 frame shown in FIG. 10, the H1 and H2 bytes are numbered with reference to the STM-1#i. In reality, the signals are transmitted in such an order as H1 byte #1, H1 byte #4, H1 byte #7, and so on, so that an order of numbering is different from an actual transmission order.

Next, the main features of a pointer processor and a pointer processing scheme for an SDH transmission system according to the present invention will be briefly summarized.

In the pointer processor and the pointer processing scheme of the present invention, 3X pairs of H1 and H2 bytes are constantly monitored, where AU-4-Xc (X is a natural number) is supposed to be a prescribed maximum size AU pointer that can possibly be received at the pointer processor. Then, which part of these 3X pairs of H1 and H2 bytes are occupied by which AU-size is mapped as a received AU-size map. Then, when the received AU-size map is identically received through a prescribed number of frames for confirmation. The confirmation process is necessary in order to prevent the pointer processor from operating falsely due to bit errors on the transmission line. This received AU-size map is held in the pointer processor as an inside AU-size map.

Here, the inside AU-size map is changed only when all the AU pointers interpreted from 3X pairs of H1 and H2 bytes are ascertained without a contradiction as normal pointers or AISs in sizes not greater than that of AU-4-Xc, and when the received AU-size map is identical through a prescribed number of frames for confirmation. Consequently, when any pointer other than the normal pointer and the AIS is received, the inside AU-size map will not be changed.

On the other hand, an assigned AU-size map indicating an assigned state of the AU pointer sizes on 3X pairs of H1 and H2 bytes is generated according to the AU pointer sizes set by the external network management system, and held in this pointer processor. Then, the inside AU-size map and the assigned AU-size map are compared.

For a part of the map where the inside AU-size map coincides with the assigned AU-size map, the pointer processor carries out the usual size-fixed pointer interpretations and generations within the pointer sizes specified by the assigned AU-size map. Here, the usual size-fixed pointer interpretation and generation can be carried out as described in the ITU-T recommendation G.783, FIGS. 2-8/G.783. As for a part of the map where the inside AU-size map does not coincide with the assigned AU-size map, the pointer processor declares an LOP in the pointer size specified by the assigned AU-size map, and the AIS in that pointer size is used as the transmission pointer.

When the AU pointer size is not assigned from the management system, this pointer processor maintains the inside AU-size map, and the usual size-fixed pointer processing within the AU-sizes specified by this inside AU-size map is carried out.

Referring now to FIG. 9 to FIG. 15, the first embodiment of a pointer processor and a pointer processing scheme for an SDH transmission system according to the present invention will be described in detail.

Figure 11:
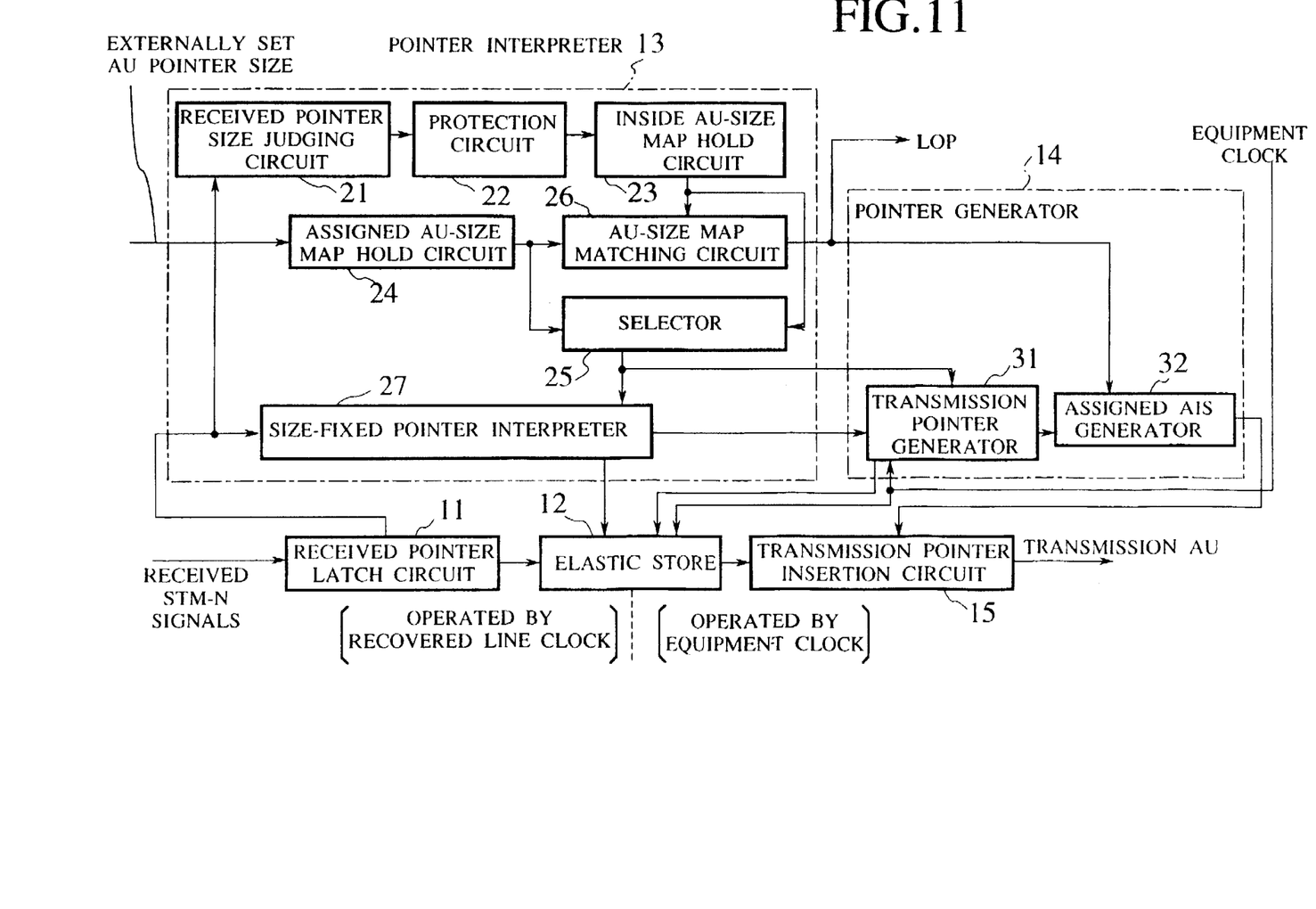
FIG. 11 is a detailed block diagram of a pointer processor according to the first embodiment of the present invention.

In this first embodiment, the pointer processor has a configuration as shown in FIG. 11, which comprises: a received pointer latch circuit 11 receiving the received STM-N signals and detecting AU pointers from 3N pairs of H1 and H2 bytes contained in the received STM-N signals; an elastic store 12 connected with the received pointer latch circuit 11; a transmission pointer insertion circuit 15 connected with the elastic store 12; a pointer interpreter 13 connected with the received pointer latch circuit 11 and the elastic store 12; and a pointer generator 14 connected with the elastic store 12, the transmission pointer insertion circuit 15, and the pointer interpreter 13.

The pointer interpreter 13 further comprises: a received pointer size judging circuit 21 connected with the received pointer latch circuit 11; a protection circuit 22 connected with the received pointer size judging circuit 21; an inside AU-size map hold circuit 23 connected with the protection circuit 22; an assigned AU-size map hold circuit 24 receiving AU pointer sizes set by the network management system; a selector 25 connected with the inside AU-size map hold circuit 23 and the assigned AU-size map hold circuit 24; an AU-size map matching circuit 26 connected with the inside AU-size map hold circuit 23 and the assigned AU-size map hold circuit 24; and a size-fixed pointer interpreter 27 connected with the received pointer latch circuit 11, the selector 25, and the elastic store 12.

The pointer generator 14 further comprises: a transmission pointer generator 31 connected with the selector 25, the size-fixed pointer interpreter 27, and the elastic store 12; and an assigned AIS generator 32 connected with the AU-size map matching circuit 26, the transmission pointer generator 31, and the transmission pointer insertion circuit 15.

The elastic store 12 and the transmission pointer generator 31 are supplied with an equipment clock.

The received pointer latch circuit 11 has a function for detecting AU pointers from 3N pairs of H1 and H2 bytes contained in the received STM-N signals. The elastic store 12 extracts all VCs contained in the received STM-N signals synchronized with a recovered line clock and synchronizes the extracted VCs to an equipment clock. The transmission pointer insertion circuit 15 inserts the transmission pointer into the AU synchronized with the equipment clock at the elastic store 12 and outputs a resulting transmission AU. The pointer interpreter 13 judges received pointer indications and values from received AU pointers notified from the received pointer latch circuit 11, and generates inside pointers according to the received pointer indications and values in a normal case. The pointer generator 14 generates transmission pointers from the inside pointers and a phase difference between the recovered line clock and the equipment clock in a normal case.

Supposing that AU-4-Xc is the maximum size AU pointer that can possibly be received by this pointer processor, the received pointer size judging circuit 21 constantly monitors 3X pairs of H1 and H2 bytes, judges the 3X pointer indications (N or C or A) contained in these 3X pairs of H1 and H2 bytes, and generates a received AU-size map. When the maximum size AU pointer that can possibly be received by this pointer processor is AU-4-16c, for example, fourty-eight pairs of H1 and H2 bytes as shown in FIG. 9 are going to be constantly monitored.

When this identical received AU-size map is successively received through a prescribed number of frames for confirmation in the protection circuit 22, it is held as an inside AU-size map in the inside AU-size map hold circuit 23. In other words, the change of the inside AU-size map is carried out only when the identical received AU-size map is received through all the prescribed number of frames for confirmation.

The assigned AU size map hold circuit 24 holds an assigned AU-size map according to the AU pointer sizes set by the network management system. The selector 25 selectively outputs either one of the inside AU-size map or the assigned AU-size map to the size-fixed pointer interpreter 27 and the transmission pointer generator 31. Here, the selector 25 selects the inside AU-size map when no AU pointer size is assigned from the network management system, whereas the selector 25 selects the assigned AU-size map when the AU pointer sizes are assigned by the network management system. In units of AU pointer size according to the map received from the selector 25, the size-fixed pointer interpreter 27 carries out the usual size-fixed pointer interpretations, and the transmission pointer generator 31 carries out the usual pointer generation.

The AU-size map matching circuit 26 only functions at a time of the assigned mode setting, and carries out a comparison of the inside AU-size map and the assigned AU-size map. For a part of map where the inside AU-size map is different from the assigned AU-size map, the AU-size map matching circuit 26 issues LOP warnings in the assigned pointer sizes, which are supplied to the assigned AIS generator 32 as well as to the external network management system. In this case, the assigned AIS generator 32 generates the AISs in the assigned pointer sizes and outputs these AISs to the transmission pointer insertion circuit 15.

Figure 12:
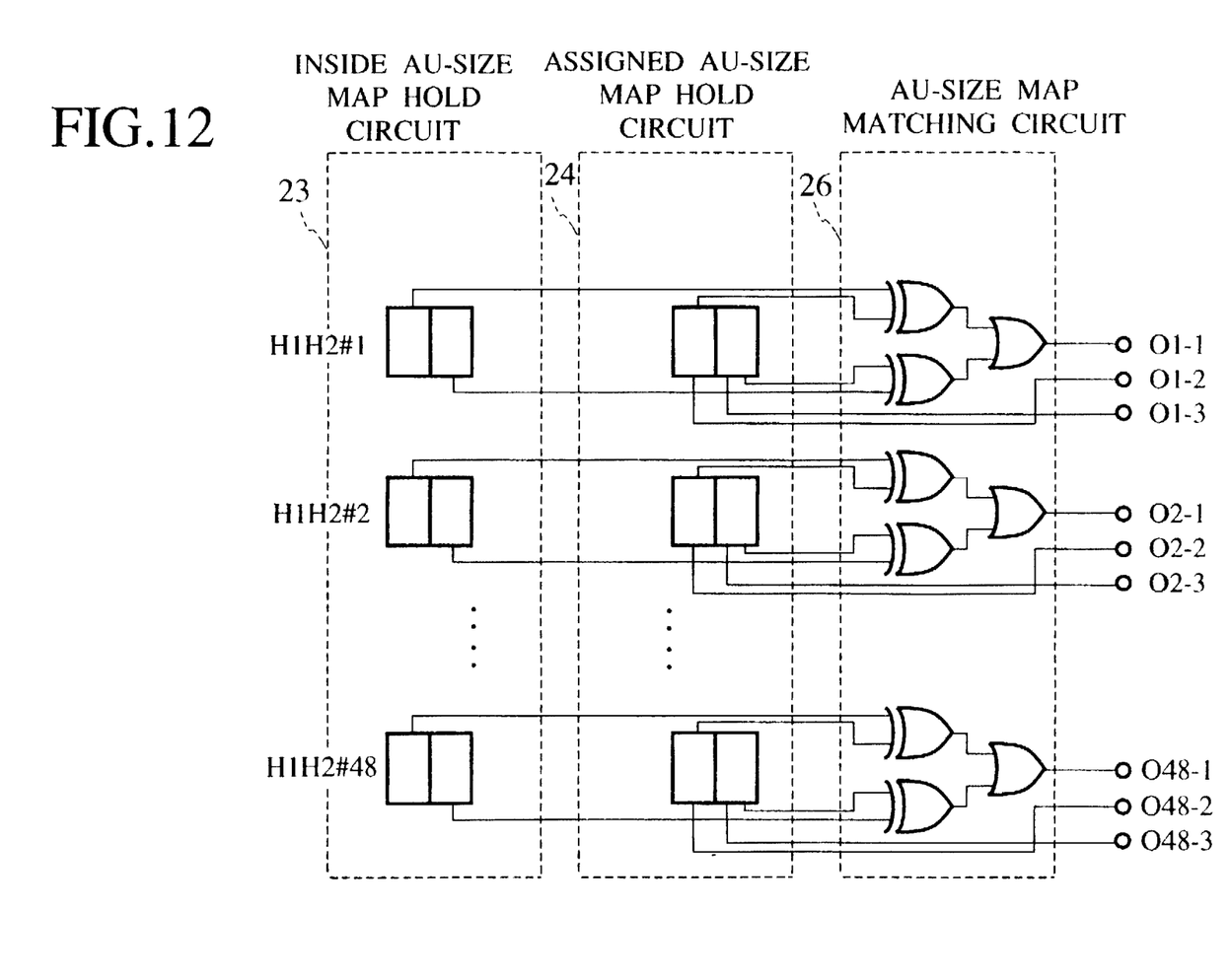
FIG. 12 is a block diagram showing an exemplary configuration of an AU-size map matching circuit in the pointer processor of FIG. 11.

FIG. 12 shows an exemplary configuration of the AU-size map matching circuit 26 in relation to the inside AU-size map hold circuit 23 and the assigned AU-size map hold circuit 24, for an exemplary case in which the maximum AU pointer size that can possibly be received by this pointer processor is AU-4-16c.

Here, it is assumed that each of the inside AU-size map hold circuit 23 and the assigned AU-size map hold circuit 24 is formed by a memory of 2 bits×48 words capacity, and an occupied state of each H1 and H2 bytes pair #i can be indicated by 2 bits. These 2 bits indicate a value "00", "01", "10", or "11", when a certain H1 and H2 bytes pair #i contains an AU-3 pointer, a part of an AU-4 pointer, a part of an AU-4-4c pointer, or a part of an AU-4-16c pointer, respectively. For example, when an AU-4 pointer is contained in the H1 and H2 bytes pairs #1, #2, and #3, a value "01" is entered into bits corresponding to the H1 and H2 bytes pairs #1, #2, and #3 in the respective hold circuit.

The AU-size map matching circuit 26 provides three output terminals Oi-1, Oi-2, and Oi-3 with respect to each H1 and H2 bytes pair #i, where the output Oi-1 indicates coincidence/non-coincidence of the inside AU-size map and the assigned AU-size map, while the outputs Oi-2 and Oi-3 indicate the assigned pointer size. The output Oi-1 has a value "0" when the inside AU-size map and the assigned AU-size map are coinciding, or a value "1" otherwise.

Figure 13:
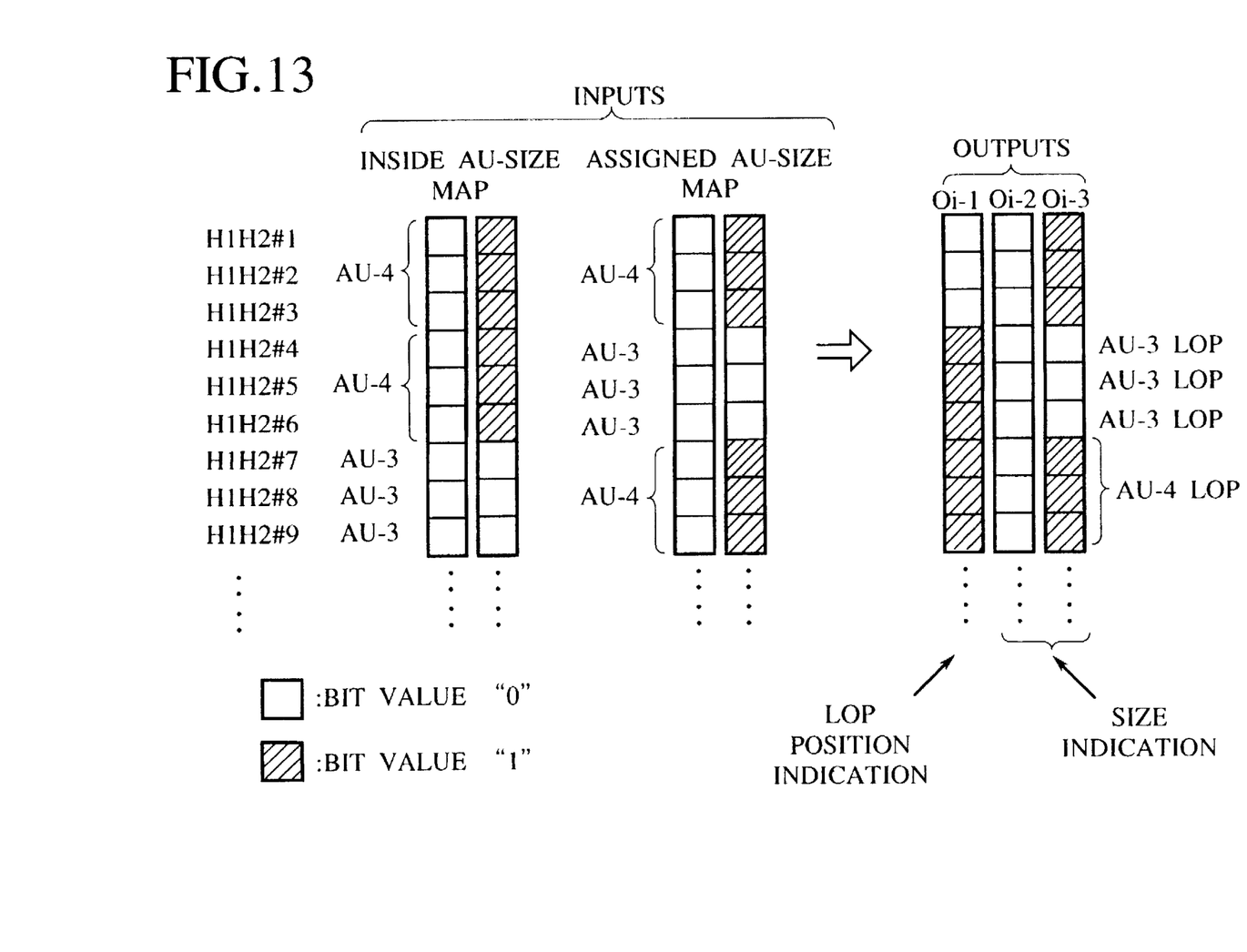
FIG. 13 is a diagram illustrating an exemplary operation by the AU-size map matching circuit shown in FIG. 12.

FIG. 13 shows an exemplary operation of this AU-size map matching circuit 26, which is for an exemplary case in which the inside AU-size map and the assigned AU-size map do not coincide at the H1 and H2 bytes pairs #4 to #9. In this case, for the output Oi-1 of the AU-size map matching circuit 26, each of O4-1 to O9-1 has a value "1", while each of O1-1 to O3-1 has a value "0".

Figure 14:
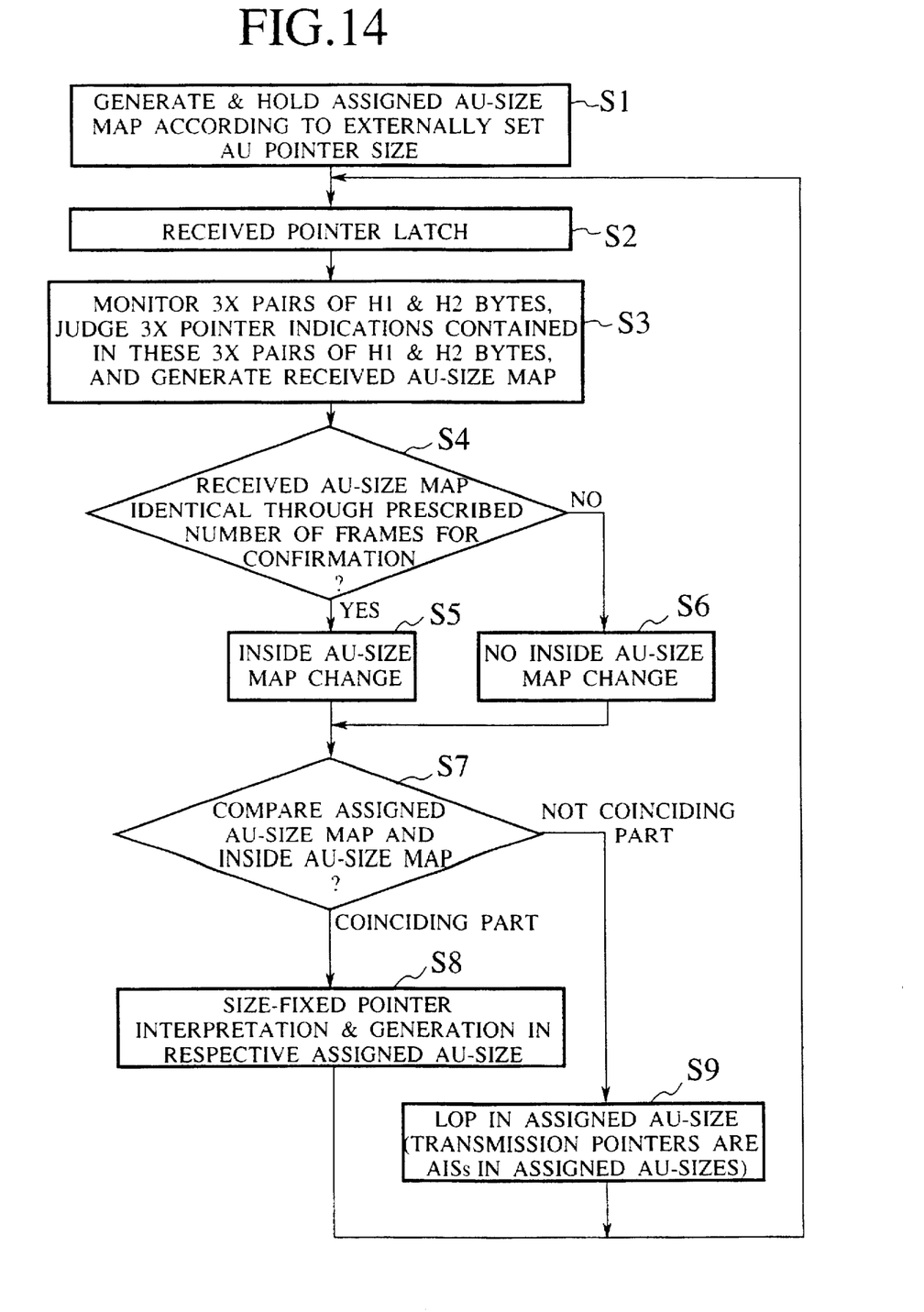
FIG. 14 is a flow chart for the pointer processing operation by the pointer processor of FIG. 11.

With this configuration of FIG. 11, the pointer processor of this first embodiment operates according to the flow chart of FIG. 14 as follows.

First, according to the AU pointer sizes set by the network management system, the assigned AU-size map is generated and held at the assigned AU-size map hold circuit 24 (step S1).

Then, the received pointer latch circuit 11 receives the STM-N signals, and detects all AU pointers contained in 3N pairs of H1 and H2 bytes (step S2).

Also, 3X pairs of H1 and H2 bytes to be contained in the maximum size AU pointer AU-4-Xc that can possibly be received by this pointer processor are monitored, the 3X pointer indications (N or C or A) contained in these 3X pairs of H1 and H2 bytes are judged, and the received AU-size map is generated at the received pointer size judging circuit 21 (step S3).

Then, whether the received AU-size map has been identical through a prescribed number of frames for confirmation in the protection circuit 22 or not is judged (step S4). When the received AU-size map has been identical through a prescribed number of frames for confirmation, the inside AU-size map held in the inside AU-size map hold circuit 23 is changed to this received AU-size map (step S5), whereas otherwise the inside AU-size map held in the inside AU-size map hold circuit 23 is left unchanged (step S6).

Then, the assigned AU-size map held in the assigned AU-size map hold circuit 24 and the inside AU-size map held in the inside AU-size map hold circuit 23 are compared at the AU-size map matching circuit 26 (step S7).

For a part which coincides among the assigned AU-size map and the inside AU-size map, the usual size-fixed pointer interpretation and generation in the respective assigned AU-sizes are carried out at the size-fixed pointer interpreter 27 and the transmission pointer generator 31 (step S8).

For a part which does not coincide among the assigned AU-size map and the inside AU-size map, the LOP warnings in the assigned AU-sizes are issued at the AU-size map matching circuit 26, and the AISs in the assigned AU-size are generated at the assigned AIS generator 32 as a transmission pointer (step S9).

After the step S8 or S9, the operation returns to the step S2 for the next received pointer.

Figure 15:
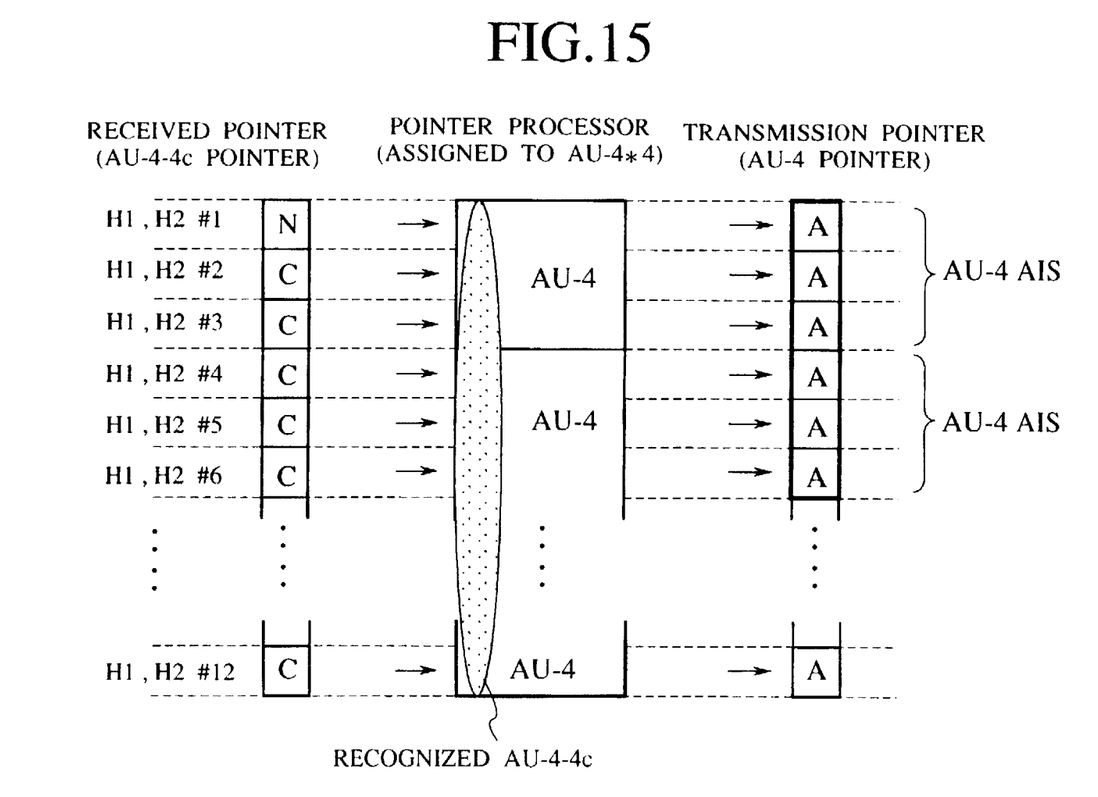
FIG. 15 is a diagram illustrating an exemplary operation by the pointer processor of FIG. 11, in a conventionally problematic situation.

Now, when the pointer processor of this first embodiment receives the AU pointer of a size larger than the assigned size due to an erroneous connection of transmission lines or an erroneous AU assignment by the network management system, the pointer processor of this first embodiment operates as indicated in FIG. 15.

Namely, when this pointer processor receives the AU-4-4c pointer, after this AU-4-4c pointer is received through the frames for confirmation, this pointer processor generates the inside AU-size map which indicates that the H1 and H2 bytes pairs #1 to #12 are occupied by the AU-4-4c pointer. When this inside AU-size map is compared with the assigned AU-size map of AU-4*4, the non-coincidence is recognized so that the the AU-4 LOP warnings are issued and the AU-4 AISs are outputted as the transmission pointers.

In contrast to the conventional case shown in FIG. 8 where an AU-4 normal pointer is erroneously used as the transmission pointer for a part corresponding to the H1 and H2 bytes pairs #1, #2, and #3, the pointer processor of this first embodiment uses the AU-4 AIS as the transmission pointer for this part. In other words, the pointer processor of this first embodiment can effectively prevents a conventionally encountered problematic situation in which a part of the VC path is erroneously passed as a normal path when the received pointer size and the assigned pointer size are different due to an erroneous connection of transmission lines or an erroneous AU assignment by the network management system.

Figure 16:
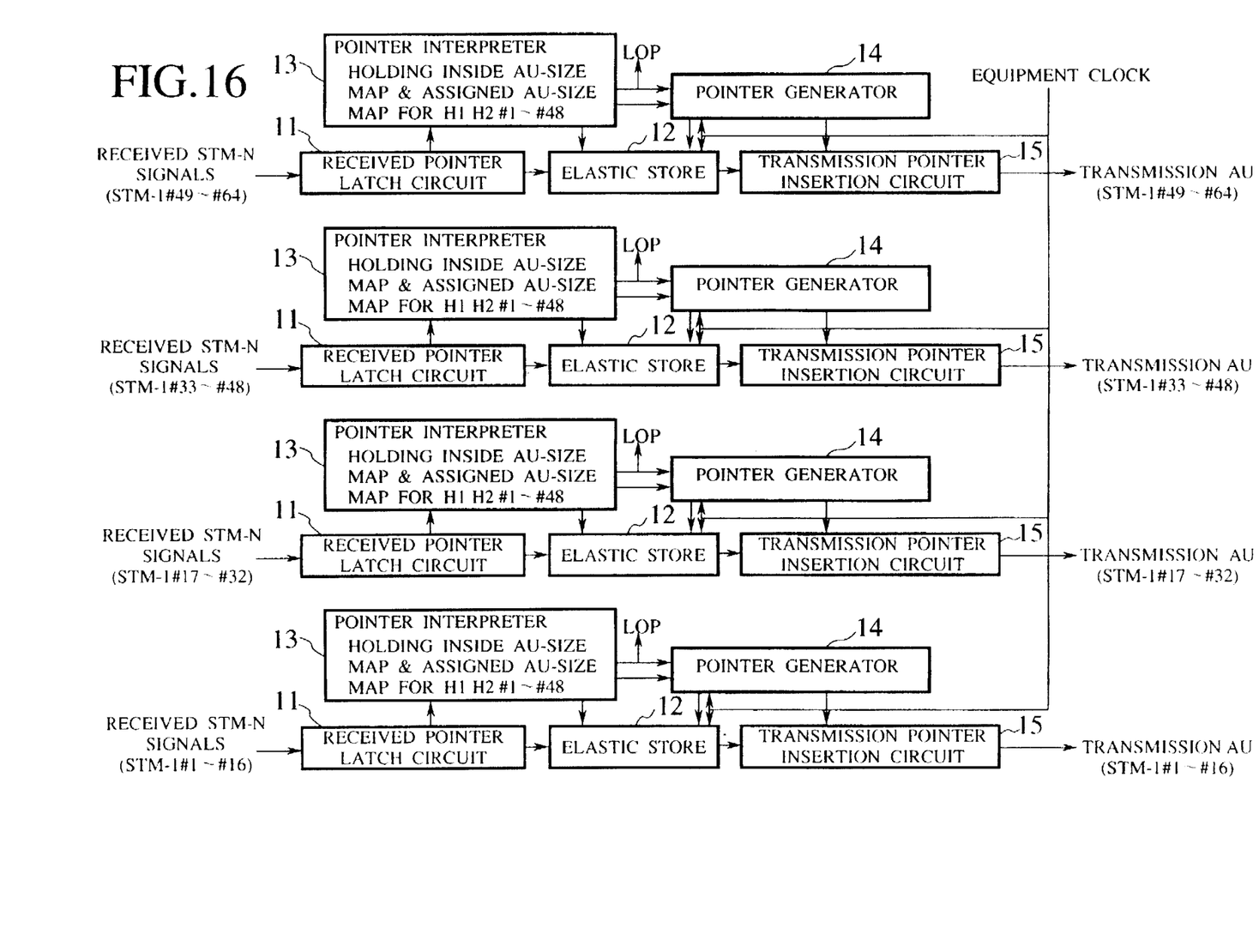
FIG. 16 is a schematic block diagram of a pointer processor according to the second embodiment of the present invention.

Referring now to FIG. 16, the second embodiment of a pointer processor and a pointer processing scheme for an SDH transmission system according to the present invention will be described in detail.

This second embodiment is directed to the pointer processor for STM-64 signals, which is realized by utilizing the pointer processor of the first embodiment described above.

For the pointer processor of this second embodiment, it is supposed that the maximum size AU pointer that can possibly be received is AU-4-16c. The AU-4-16c pointer is contained in the H1 and H2 bytes in STM-1#i to #i+15 (i=1, 17, 33, 49) as indicated in FIG. 10, and VC-4-16c pointed by this AU-4-16c pointer is obviously also contained in STM-1#i to #i+15 (i=1, 17, 33, 49).

For this reason, as shown in FIG. 16, the pointer processor of this second embodiment is formed from four sections including STM-1#1 to #16 processing section, STM-1#17 to #32 processing section, STM-1#33 to #48 processing section, and STM-1#49 to #64 processing section. Each section comprises the received pointer latch circuit 11, the elastic store 12, the pointer interpreter 13, the pointer generator 14, and the transmission pointer insertion circuit 15, just as the pointer processor of the first embodiment.

In this pointer processor of FIG. 16, the pointer interpreter 13 of each section holds the inside AU-size map and the assigned AU-size map for forty-eight pairs of H1 and H2 bytes.

Also, in STM-1#1 to #16 processing section for example, the received pointer latch circuit 11 detects .AU pointers from the H1 and H2 bytes pairs of STM-1#1 to #16 the elastic store 12 extracts all VCs contained in STM-1#1 to #16 synchronized with a recovered line clock and synchronizes the extracted VCs to an equipment clock, and the transmission pointer insertion circuit 15 inserts the transmission pointer into all the AUs contained in STM-1#1 to #16, just as in the pointer processor of the first embodiment.

Thus the pointer processor of this second embodiment is formed by four sections, each of which is substantially equivalent to the pointer processor of the first embodiment. Obviously, each section operates similarly as the pointer processor of the first embodiment, so that the similar effects as in the pointer processor of the first embodiment can also be realized in the pointer processor of this second embodiment.

As described, according to the present invention, it is possible to prevent a problematic situation in which a part of the received path is erroneously taken out and passed as a normal path when the received pointer size is larger than the assigned pointer size. Although a future transmission equipment is expected to convey a variety of paths ranging from VC-3 to VC-4-Xc, it is possible to realize a proper VC path management in such a future transmission equipment by installing the pointer processor of the present invention.

It is to be noted that the pointer processor and the pointer processing scheme of the present invention is equally applicable to the SDH transmission system standardized by the ITU-T as well as to the SONET transmission system standardized by the ANSI (American National Standards Institute) in the U.S.A. Note that SONET frame format is similar to SDH frame format at stages above 155.52 Mbit/s. The SONET frame format also has the byte-interleaving structure similar to that of SDH, and employs pointers in the Overhead Bytes to point the start points of conveyed paths (called STS-SPE in the SONET definition).

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A pointer processor for an SDH/SONET transmission system, comprising:

a pointer latch circuit for detecting AU pointers from 3N pairs of H1 and H2 bytes contained in received STM-N signals;

an elastic store for extracting all VCs contained in the received STM-N signals synchronized with a recovered line clock and synchronizing the extracted VCs to an equipment clock;

a pointer interpreter for judging received pointer indications and values from AU pointers notified from the received pointer latch circuit and generating inside pointers according to the received pointer indications and values;

a pointer generator for generating transmission pointers from the inside pointers and a phase difference between the recovered line clock and the equipment clock; and a transmission pointer insertion circuit for inserting the transmission pointers into AUs outputted from the elastic store and transmitting resulting transmission AUs, wherein the pointer interpreter constantly monitors 3X pairs of H1 and H2 bytes to contain a prescribed maximum size pointer AU-4-Xc that can possibly be received by the pointer processor, where X is a natural number equal to or less than N, to obtain and hold an inside AU-size map indicating an occupation state of AU pointers on said 3X pairs of H1 and H2 bytes;

the pointer interpreter generates and holds an assigned AU-size map indicating an assigned state of AU pointers on said 3X pairs of H1 and H2 bytes according to externally set AU pointer sizes;

the pointer interpreter carries out size-fixed pointer interpretations in pointer sizes specified by the assigned AU-size map, for a part of map where the inside AU-size map coincides with the assigned AU-size map;

the pointer generator generates transmission pointers in forms of normal pointers or AISs (Alarm Indication Signals) in the pointer sizes specified by the assigned AU-size map according to the size-fixed pointer interpretations, for a part of map where the inside AU-size map coincides with the assigned AU-size map; and the pointer generator generates AISs in the pointer sizes specified by the assigned AU-size map as transmission pointers, for a part of map where the inside AU-size map does not coincide with the assigned AU-size map.

2. The pointer processor of claim 1, wherein the pointer interpreter issues LOP (Loss of Pointer) warnings in the pointer sizes specified by the assigned AU-size map for a part of map where the inside AU-size map does not coincide with the assigned AU-size map.

3. The pointer processor of claim 1, wherein the pointer interpreter generates a received AU-size map indicating an occupation state of AU pointers on said 3X pairs of H1 and H2 bytes as monitored, and obtains the inside AU-size map by receiving the received AU-size map successively through a prescribed number of frames for confirmation.

4. The pointer processor of claim 3, wherein the pointer interpreter changes the inside AU-size map held in the pointer processor only when all AU pointers interpreted from said 3X pairs of H1 and H2 bytes are ascertained as normal pointers or AISs in sizes not greater than that of AU-4-Xc, and an identical received AU-size map is received successively through said prescribed number of frames for confirmation.

5. The pointer processor of claim 1, wherein when there is no externally set AU pointer size, the pointer interpreter carries out size-fixed pointer interpretations in pointer sizes specified by the inside AU-size map, and the pointer generator generates the transmission pointers in forms of normal pointers or AISs in the pointer sizes specified by the inside AU-size map according to the size-fixed pointer interpretations.

6. A method of pointer processing in a pointer processor for an SDH/Sonet transmission system, comprising the steps of:

detecting AU pointers from 3N pairs of H1 and H2 bytes contained in received STM-N signals;

extracting all VCs contained in the received STM-N signals synchronized with a recovered line clock and synchronizing the extracted VCs to an equipment clock at an elastic store;

generating and holding an assigned AU-size map indicating an assigned state of AU pointers on 3X pairs of H1 and H2 bytes to contain a prescribed maximum size pointer AU-4-Xc that can possibly be received by the pointer processor, where X is a natural number equal to or less than N, according to externally set AU pointer sizes;

judging received pointer indications and values from AU pointers and generating inside pointers according to the received pointer indications and values;

constantly monitoring said 3X pairs of H1 and H2 bytes to obtain and hold an inside AU-size map indicating an occupation state of AU pointers on said 3X pairs of H1 and H2 bytes;

comparing the inside AU-size map and the assigned AU-size map;

carrying out size-fixed pointer interpretations in pointer sizes specified by the assigned AU-size map, for a part of map where the inside AU-size map coincides with the assigned AU-size map;

generating transmission pointers in forms of normal pointers or AISs (Alarm Indication Signals) in the pointer sizes specified by the assigned AU-size map according to the size-fixed pointer interpretations, for a part of a map where the inside AU-size map coincides with the assigned AU-size map;

generating AISs in the pointer sizes specified by the assigned AU-size may as the transmission pointers, for a part of map where the inside AU-size map does not coincide with the assigned AU-size map; and inserting the transmission pointers into AUs outputted from the elastic store and transmitting resulting transmission AUs.

7. The method of claim 6, further comprising the step of issuing LOP (Loss of Pointer) warnings in the pointer sizes specified by the assigned AU-size map for a part of map where the inside AU-size map does not coincide with the assigned AU-size map.

8. The method of claim 6, further comprising the step of generating a received AU-size map indicating an occupation state of AU pointers on said 3X pairs of H1 and H2 bytes as monitored, and obtaining the inside AU-size map by receiving the received AU-size map successively through a prescribed number of frames for confirmation.

9. The method of claim 8, further comprising the step of changing the inside AU-size map held in the pointer processor only when all AU pointers interpreted from said 3X pairs of H1 and H2 bytes are ascertained as normal pointers or AISs in sizes not greater than that of AU-4-Xc, and an identical received AU-size map is received successively through said prescribed number of frames for confirmation.

10. The method of claim 6, further comprising the step of carrying out size-fixed pointer interpretations in pointer sizes specified by the inside AU-size map, and generating the transmission pointers in forms of normal pointers or AISs in the pointer sizes specified by the inside AU-size map according to the size-fixed pointer interpretations, when there is no externally set AU pointer size.

* * * * *